(12) United States Patent
Sakamoto et al.

(10) Patent No.: US 7,617,047 B2
(45) Date of Patent: Nov. 10, 2009

(54) MAP INFORMATION SYSTEM AND MAP INFORMATION PROCESSING METHOD AND PROGRAM

(75) Inventors: Hiroko Sakamoto, Saitama (JP); Yosuke Nitta, Narashino (JP); Masumi Sato, Tokyo (JP); Keisuke Otsuka, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 706 days.

(21) Appl. No.: 11/440,036

(22) Filed: May 25, 2006

(65) Prior Publication Data
US 2007/0129887 A1 Jun. 7, 2007

(30) Foreign Application Priority Data
Dec. 1, 2005 (JP) ............................. 2005-347445

(51) Int. Cl.
G01C 21/30 (2006.01)
G01C 21/32 (2006.01)
(52) U.S. Cl. .................. 701/211; 701/208; 340/990; 707/E17.111; 707/E17.18
(58) Field of Classification Search ............ 701/211, 701/208; 340/990; 707/E17.111, E17.018; 342/357.06; 178/18.01, 19.01; 382/113
See application file for complete search history.

(56) References Cited

U.S. PATENT DOCUMENTS

| | | | | |
|---|---|---|---|---|
| 4,158,194 A * | 6/1979 | McWaters et al. | ........... | 382/313 |
| 5,793,301 A * | 8/1998 | Patterson et al. | ........... | 340/7.23 |
| 5,848,373 A * | 12/1998 | DeLorme et al. | ............ | 701/200 |
| 5,948,040 A * | 9/1999 | DeLorme et al. | ............ | 701/201 |
| 6,118,964 A * | 9/2000 | Kojima et al. | ............... | 399/174 |
| 6,163,749 A * | 12/2000 | McDonough et al. | ....... | 701/208 |
| 6,182,010 B1 * | 1/2001 | Berstis | ....................... | 701/211 |

(Continued)

FOREIGN PATENT DOCUMENTS

JP 9-138131 5/1997

(Continued)

OTHER PUBLICATIONS

Uniting the Paper and Digital Worlds; Schreiner, K.; Computer Graphics and Applications, IEEE—vol. 28, Issue 6, Nov.-Dec. 2008 pp. 6-10; Digital Object Identifier 10.1109/MCG.2008.124.*

(Continued)

Primary Examiner—Cuong H Nguyen
(74) Attorney, Agent, or Firm—Mattingly & Malur, P.C.

(57) ABSTRACT

A map information system is provided which includes an electronic pen which reads a dot pattern in a form where map images are shown, to output handwriting information, and a processing unit including an association module which associates the output handwriting information with one of the map images where the handwriting information is written and stores it in a storage unit, a search module which searches for the associated handwriting information and map image using information to specify the map image as a search key, a pattern assignment module which when acquiring print request information including information to specify the map images to be printed, newly assigns a dot pattern, and an output instruction module which issues an output instruction so as to cause an output unit to visually output data including the retrieved associated handwriting information and map image and the newly assigned dot pattern.

12 Claims, 7 Drawing Sheets

U.S. PATENT DOCUMENTS

| | | | | |
|---|---|---|---|---|
| 6,199,012 | B1* | 3/2001 | Hasegawa | 701/208 |
| 6,839,623 | B1* | 1/2005 | Tillgren et al. | 701/200 |
| 7,255,413 | B2* | 8/2007 | Reyero et al. | 347/15 |
| 2007/0129887 | A1* | 6/2007 | Sakamoto et al. | 701/211 |
| 2008/0068627 | A1* | 3/2008 | Hart et al. | 358/1.9 |

FOREIGN PATENT DOCUMENTS

| | | | |
|---|---|---|---|
| JP | 2000-259659 | | 9/2000 |
| JP | 2004-294942 | | 10/2004 |
| JP | 2006003791 | A * | 1/2006 |
| JP | 2007155866 | A * | 6/2007 |
| JP | 2007193466 | A * | 8/2007 |
| JP | 2008185940 | A * | 8/2008 |
| JP | 2008209845 | A * | 9/2008 |

OTHER PUBLICATIONS

Real-Time Tracking of Visually Attended Objects in Virtual Environments and Its Application to LOD; Sungkil Lee; Kim, G.J.; Seungmoon Choi; Visualization and Computer Graphics, IEEE Transactions on; vol. 15, Issue 1, Jan.-Feb. 2009 pp. 6-19; Digital Object Identifier 10.1109/TVCG.2008.82.*

Methods for Presenting Braille Characters on a Mobile Device with a Touchscreen and Tactile Feedback; Rantala, J.; Raisamo, R.; Lylykangas, J.; Surakka, V.; Raisamo, J.; Salminen, K.; Pakkanen, T.; Hippula, A.; Haptics, IEEE Transactions on; vol. 2, Issue 1, Jan.-Mar. 2009 pp. 28-39; Digital Object Identifier 10.1109/TOH.2009.3.*

A novel scheme for retrieval of handwritten textual annotations for information just in time (iJIT); Basu, S.; Kouske Konishi; Furukawa, N.; Ikeda, H.; TENCON 2008-2008, TENCON 2008. IEEE Region 10 Conference, Nov. 19-21, 2008 pp. 1-6 Digital Object Identifier 10.1109/TENCON.2008.4766776.*

Drawing on Paper Maps: Reliable On-line Symbol Recognition of Handwritten Symbols Using a Digital Pen and a Mobile Phone Sylverberg, T.; Kristensson, P.O.; Leifler, O.; Berglund, E.;Pervasive Computing and Applications, 2007. ICPCA 2007. 2nd International Conference on,Jul. 26-27, 2007 pp. 515 - 520,Digital Object Identifier 10.1109/ICPCA.2007.*

Online text independent writer identification using character prototypes distribution; Siew Keng Chan; Yong Haur Tay; Viard-Gaudin, C.; Information, Communications & Signal Processing, 2007 6th International Conference on; Dec. 10-13, 2007 pp. 1-5 ; Digital Object Identifier 10.1109/ICICS.2007.4449745.*

Techniques for Developing Pen Tablet Aided Instruction Applications; Rui Zhu; Huichuan Duan; Information Technologies and Applications in Education, 2007. ISITAE '07. First IEEE International Symposium on, Nov. 23-25, 2007 pp. 407-410 Digital Object Identifier 10.1109/ISITAE.2007.4409314.*

* cited by examiner

MAP INFORMATION SYSTEM AND MAP INFORMATION PROCESSING METHOD AND PROGRAM

CROSS REFERENCE TO RELATED APPLICATIONS

This application claims the foreign priority benefit under Title 35, United States Code, §119(a)-(d) of Japanese Patent Application No. 2005-347445, filed on Dec. 1, 2005 in the Japan Patent Office, the disclosure of which is herein incorporated by reference in its entirety.

BACKGROUND OF THE INVENTION

1. Field of the Invention

The present invention relates to a map information system which can reflect information written by a user, on a map, and more specifically, to a map information system which can reflect information written by a user, in maps even in different types of forms as long as the maps in the forms are the same.

2. Description of the Related Art

Conventionally, various technologies have been proposed which detect and convert two-dimensional position information of a specific point in a map printed on paper and output the detected and converted two-dimensional position information as a set of coordinates in the map. One of the technologies is a map information acquisition technology with GIS (Geographic Information System).

In a map information acquisition method using GIS, data for a map are directly input as electronic map information so that an electronic map can be reproduced in the computer. Thus, it is possible to create and analyze databases using the electro map information of the electronic map.

For instance, there is described in JP 2000-259659A a geographic information system where geographic information acquired from a GIS database is made available for general use. In the geographic information system described in JP 2000-259659A, the geographic information acquired from the GIS database is converted into a file in XML (Extensible Markup Language) format. Then, the converted file is associated with format information which specifies a drawing method. Consequently, the geographic information is analyzed based on the format information so as to acquire a geographic space.

Among methods to acquire map information other than the method using GIS, there is a method which fixes a sheet where coordinates are written, on a map. Thus, a set of coordinates in the sheet for an arbitrary point in the map is read. In addition, there is another method where a map is divided into a plurality of sections in order to specify a position in a whole map using a section number of one of the sections and a relative position in the section. In these cases, a transparent panel or tablet is used to input the map information while button operation or pen input is performed to acquire the map information from the map.

As one of examples of such technologies, there is described in JP H09-138131A a position coordinate determination device in which destination position is input in an atlas and current position is shown in the atlas. In the position coordinate determination device described in JP H09-138131A, a transparent tablet is fixed on a map where coordinates are specified. Then, a set of coordinates in a sheet is selected and input by a cursor to acquire a corresponding set of coordinates in the map.

In addition, there is another method to acquire map information, which uses GIS and combines information of GIS with information written using an electronic pen. Conventionally, a system using GIS has not been portable because of size and weight of its input device itself. Moreover, coordinates information is not held in the map itself. Therefore, the method often requires position adjustment between the input device and the map. In addition, the method often requires switching or zooming of a display screen, or key operation to input coordinates.

However, it becomes easy to input information since an electronic pen is employed in the method. In addition, original written information can be retained. Moreover, it is possible to take advantage of high flexibility which is specific to paper. An example of employing this technology is described in JP 2004-294942A. A map information system described in JP 2004-294942A prepares map information to be printed in advance. In addition, a dot pattern corresponding to the map information is prepared. A map image, the map information, and the dot pattern are used to create a format. Thus, a form where the dot pattern and the map information is recorded is created. Moreover, it is possible to use the created form and an electronic pen to select and input a specific position in the form and convert the position information into coordinate information.

The system described in JP 2004-294942A may be preferable as a map information system which can reflect information simply written by a user, on a map.

Meanwhile, in such a conventional map information system using an electronic pen, an electronic map where longitude and latitude are specified is divided first of all. Then, the divided electronic map is printed on electronic paper in accordance with a scale. Thus, map coordinates of the electronic map printed on the electronic paper are matched to coordinates of the electronic paper. In other words, information written in the map on the electronic paper corresponds by one to one to a dot pattern assigned to the map. Therefore, it is impossible to change definition or usage of the information in the map which is once used, for re-use.

SUMMARY OF THE INVENTION

In view of the above-mentioned circumstances, an object of the present invention is to provide a means which can reflect handwriting information written in a map with an electronic pen, on different types of forms.

In one aspect of the present invention, there is provided a map information system having an electronic pen which reads a dot pattern recorded as position information in a form where one or more map images are shown, to output a trace of a pen tip as handwriting information. In addition, the map information system has an association module which associates the handwriting information output by the electronic pen with one of the map images where the handwriting information is written and stores the associated handwriting information and map image in a storage unit, a search module which searches the storage unit to retrieve the associated handwriting information and map image using information to specify the map image as a search key, a pattern assignment module which when acquiring print request information including information to specify one or more map images to be printed, newly assigns a dot pattern to the acquired print request information, and an output instruction module which issues an output instruction so as to cause an output unit to visually output data including the associated handwriting information and map image retrieved by the search module and the dot pattern assigned by the pattern assignment module.

Other forms of embodiments according to the present invention will be described in detail in the following preferred embodiments.

DESCRIPTION OF THE PREFERRED EMBODIMENTS

Here will be described preferred embodiments of the present invention referring to the accompanying drawings.

First of all, a basic system configuration of a map information system of an embodiment according to the present invention will be described in detail.

Figure 1:
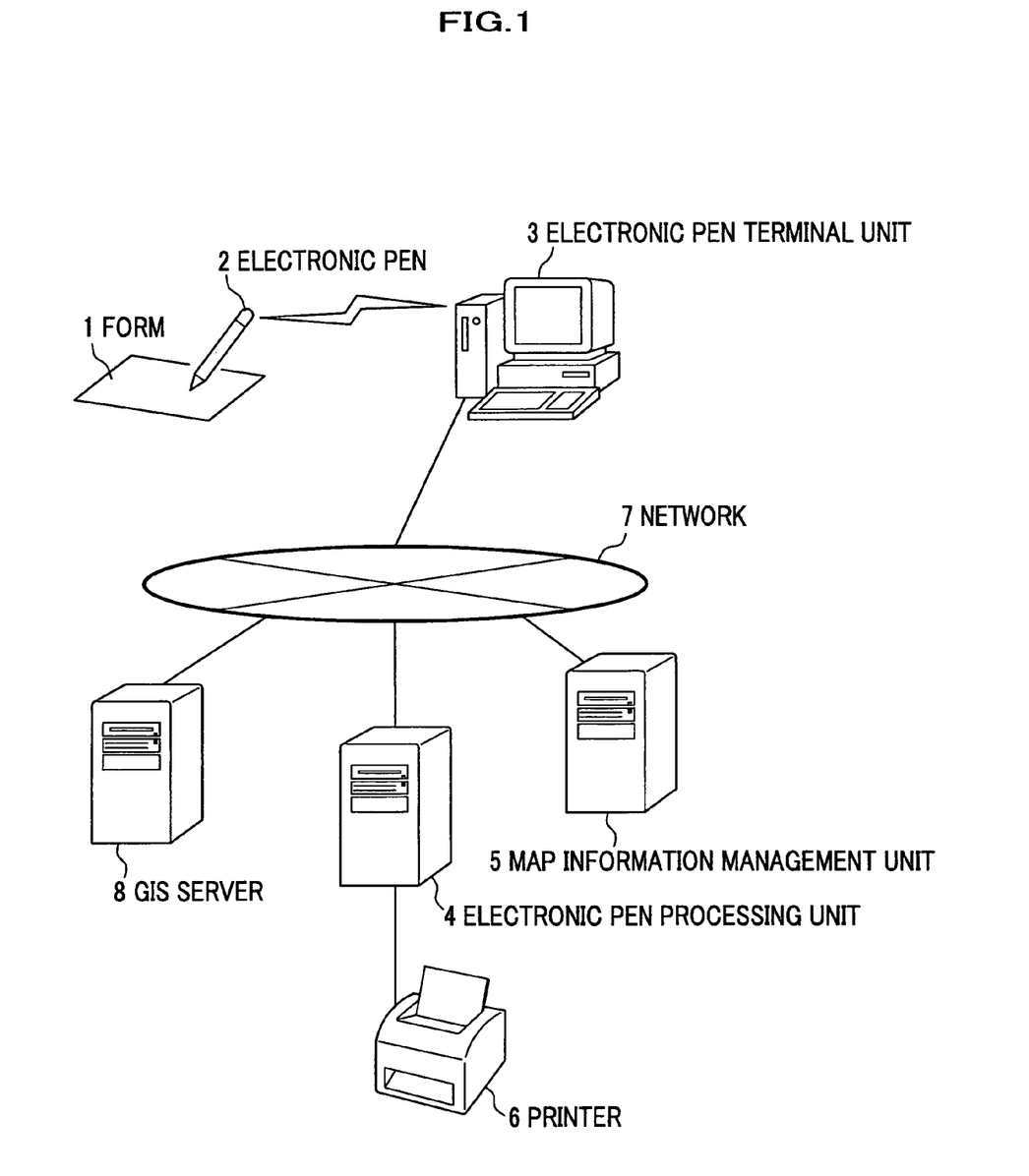
FIG. 1 is a configuration diagram of a map information system.

FIG. 1 is an example of a configuration diagram of a map information system in the present embodiment. As shown in FIG. 1, the map information system according to the present embodiment includes a form 1, an electronic pen 2, an electronic pen terminal unit 3, an electronic pen processing unit 4, and a map information management unit 5. Here, a special dot pattern to specify position is printed in the form 1. The electronic pen 2 acquires handwriting written in the form 1 as handwriting information and sends the handwriting information to the electronic pen terminal unit 3. The electronic pen terminal unit 3 sends the handwriting information and so on, which is acquired from the electronic pen 2, to the electronic pen processing unit 4. The electronic pen processing unit 4 processes the handwriting information, which is received from the electronic pen terminal unit 3, to perform character recognition and so on, and receives a print instruction from the map information management unit 5. And, the map information management unit 5 is a back-end system which uses information written in the form 1.

In addition, a GIS (Geographic Information System) server 8 is connected to the map information system of the present embodiment. The GIS server 8 holds all map information and map images in its one or more storage devices. Moreover, the GIS server 8 has functions to search for the map information or the map images in response to a request from another device and to send the retrieved map information or map images to the device.

Furthermore, a printer 6, which prints out a new form 1 in response to the print instruction from the map information management unit 5, is connected to the electronic pen processing unit 4. The electronic pen terminal unit 3, the electronic pen processing unit 4, the map information management unit 5, and the GIS server 8 are connected with each other through a network 7.

In the map information system of the present embodiment, the electronic pen processing unit 4 has the functions to acquire and store the handwriting information input with the electronic pen 2. Mainly the map information management unit 5 has the function to acquire the map information. The electronic pen processing unit 4 and the map information management unit 5 are separate devices in the present embodiment. However, they may be implemented as cooperated functions included in the same server.

The map information in the present embodiment includes an image ID to identify the map image, and attribute information, associated with a map ID to identify the map information. The attribute information is information including latitude and longitude of a representative point and a scale for the map. Besides the information, the attribute information may include information indicating a type of the map image (a topographical map, a road map, a railway map, an administrative map, or the like). In the present embodiment, types of all maps to be processed are supposed to be topographical maps, for explanation. Therefore, the information about the type is not discussed here. Moreover, in the present embodiment, the map information includes the image ID instead of the map image. However, the map information may include the map image itself.

Here, the following Table 1 shows an example of the map information of the present embodiment.

TABLE 1

| Map Information | | | | |
|---|---|---|---|---|
| Map ID | Latitude | Longitude | Scale | Image ID |
| AA001 | 29° 55' 50" | 150° 7' 5" | 1/50000 | AC001 |
| AA002 | 29° 55' 55" | 150° 7' 5" | 1/50000 | AC002 |
| . | . | . | . | . |
| . | . | . | . | . |
| . | . | . | . | . |

As shown in Table 1, the map information of the present embodiment has columns including "Map ID" to identify each map information, "Latitude" and "Longitude" of the representative point of the map, "Scale" for the map, and "Image ID" to identify the map image.

Here, the representative point in the map is specified by latitude and longitude of an upper left corner of the map, for instance.

Next, the main components of the map information system of the present embodiment will be described in detail.

(Form)

A special dot pattern is printed in the form 1 where information is to be written with the electronic pen 2. Accordingly, the form 1 functions as paper to be processed electronically. The dot pattern has a unique arrangement of dots. As a result, it is possible to identify the dot pattern by the unique arrangement of dots. When space in the form 1 is divided into grids with a predetermined size, the dots in the dot pattern are arranged so as to specify position of each of the grids. Therefore, position in the form 1 can be specified by the dot pattern. In addition, one or more map images and so forth are printed on an upper surface of the form 1 in accordance with a predetermined format. Consequently, a user of the map information system can see the map images to determine what and where to write, and so on in order to write the information in the form 1.

(Electronic Pen)

The electronic pen 2 includes a pen which is a writing means to write necessary items in the form 1 where the special dot pattern is printed, a camera to read the dot pattern printed in the form 1, a processor device to process data from the camera and create the handwriting information including position of a pen tip, which moves while writing, associated with the dot pattern, and a memory device where the handwriting information processed by the processor device is temporarily stored. Thus, the handwriting information stored in the memory device is sent to the electronic pen terminal unit 3 through Bluetooth (registered trademark), USB (Universal Serial Bus), or the like.

(Electronic Pen Terminal Unit)

The electronic pen terminal unit 3 is a terminal unit which has communication functions such as to send the handwriting information received from the electronic pen 2 to the electronic pen processing unit 4 through the network 7. Typically, a personal computer is employed as the electronic pen terminal unit 3.

(Electronic Pen Processing Unit)

The electronic pen processing unit 4 has functions such as to acquire the handwriting information sent from the electronic pen terminal unit 3, to process the handwriting information, to send the handwriting information to the map information management unit 5, and so on. Moreover, the electronic pen processing unit 4 has functions to search for the format information, the map images, the handwriting information, and so on of the form 1 corresponding to a print request ID and to send print data to which a new dot pattern is assigned to the printer 6 when acquiring print instruction information including the print request ID from the map information management unit 5.

The format information is information to define what kind of information is to be arranged in the form 1 and where in the form 1 the information is to be arranged for each type of the form 1. The format information also defines areas where characters are to be, or not to be, recognized in the handwriting information written in the form 1. The format information is defined in advance by a user or the like for each type of the form 1, and then stored in the electronic pen processing unit 4. A concept of the format information will be described later.

Figure 2:
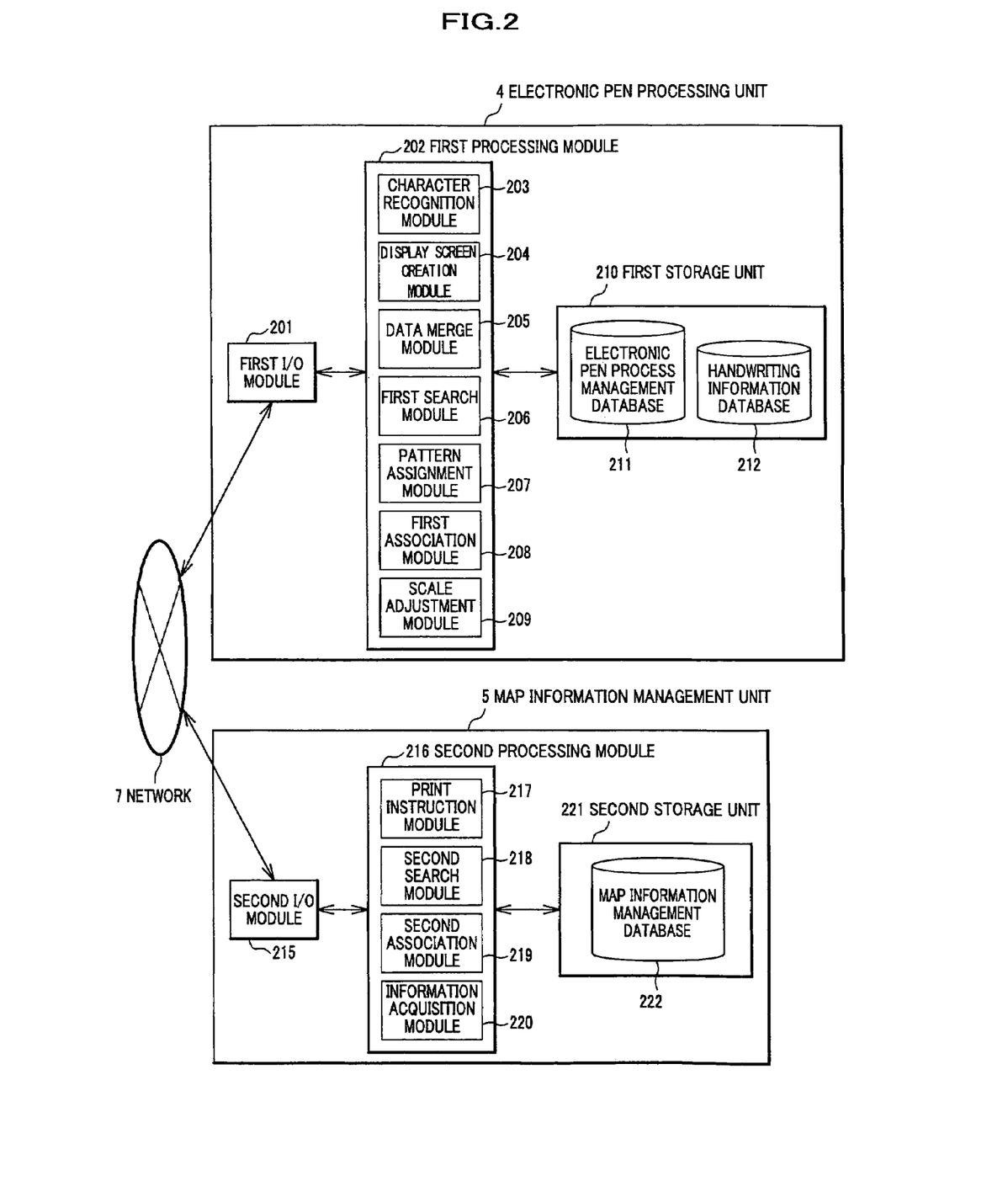
FIG. 2 is a block diagram of an electronic pen processing unit and a map information management unit.

Here, FIG. 2 is an example of a block diagram of the electronic pen processing unit 4 and the map information management unit 5 in the present embodiment. As shown in FIG. 2, the electronic pen processing unit 4 mainly has a first processing module 202 which performs various information processes, a first storage unit 210 where various data are stored, and a first I/O module 201 which is an I/O interface between the network 7 and the electronic pen processing unit 4.

The first processing module 202 includes a character recognition module 203, a display screen creation module 204, a data merge module 205, a first search module 206, a pattern assignment module 207, a first association module 208, and a scale adjustment module 209. The character recognition module 203 recognizes the handwriting information sent from the electronic pen terminal unit 3 as characters and then outputs character codes as a recognition result. The display screen creation module 204 creates a display screen to confirm the recognition result output by the character recognition module 203. The data merge module 205 merges a plurality of the handwriting information to create merged data. The first search module 206 searches the first storage unit 210 for specific data based on a search key. The pattern assignment module 207 assigns a dot pattern to a set of the format information, the handwriting information, and the map information. The first association module 208 associates the format information, the handwriting information, the map information, the dot pattern, and the print request ID which will be described later. The scale adjustment module 209 performs adjustment, cutout, and so on of the handwriting information based on the scales included in the map information. Here, a search module and an association module in the claims respectively include the first search module 206 and the first association module 208.

By the way, the display screen created by the display screen creation module 204 may be sent to and displayed in the electronic pen terminal unit 3. The display screen may be displayed also in a display device, which is not shown, connected to the electronic pen processing unit 4 or the map information management unit 5. In the display screen, when the recognition result needs to be corrected, contents of correction may be sent to the electronic pen processing unit 4. Thus, the character recognition module 203 of the electronic pen processing unit 4 may replace the recognition result with the sent contents of correction and store the corrected recognition result in the electronic pen process management database 211.

The first storage unit 210 includes an electronic pen process management database 211 and a handwriting information database 212. The electronic pen process management database 211 can hold the dot pattern of the form 1, the format information of the form 1, handwriting IDs to identify the handwriting information written in the form 1, image IDs of the map images to be inserted in the form 1, the character recognition results of the handwriting information, print request information which is acquired when the form 1 is requested to be printed, and the print request ID which will be described later. The handwriting information database 212 holds handwriting information, which is acquired from the electronic pen terminal unit 3, associated with map information (an image ID). Meanwhile, a storage unit in the claims includes the handwriting information database 212.

In addition, the electronic pen process management database 211 also holds a scale table (scale correspondence information) which is referred by the scale adjustment module 209. The scale table is a table showing inclusion relation between a map on reduced scale and maps on enlarged scale. An example of the scale table is shown in Table 2 below.

TABLE 2

Scale Table

| Map ID | Latitude | Longitude | Scale | Image ID |
| --- | --- | --- | --- | --- |
| Map ID: AA001 Scale: 1/50000 Image ID: AC001 | | | | |
| BA001 | 29° 55' 50" | 150° 7' 5" | 1/10000 | BC001 |
| BA002 | 29° 55' 50" | 150° 7' 6" | 1/10000 | BC002 |
| . | . | . | . | . |
| . | . | . | . | . |
| . | . | . | . | . |
| BA025 | 29° 55' 54" | 150° 7' 9" | 1/10000 | BC025 |
| Map ID: AA002 Scale: 1/50000 Image ID: AC002 | | | | |
| BA026 | 29° 55' 55" | 150° 7' 5" | 1/10000 | BC026 |
| . | . | . | . | . |
| . | . | . | . | . |
| . | . | . | . | . |

As shown in Table 2, the map information of maps on enlarged scale is associated with the map information of a map on reduced scale which includes the maps on enlarged scale. In other words, the electronic pen process management database 211 holds the scale table, as well as the map information.

In Table 2, columns of "Latitude" and "Longitude" express where the map on enlarged scale is located in the map on reduced scale (positional relationship). In addition, columns of "Scale" and "Image ID" respectively express scale information and information to specify a map image. Table 2 shows inclusion relation indicating that a map on reduced scale includes maps on enlarged scale when the map on reduced scale is divided into 5×5 areas which respectively correspond to the maps on enlarged scale.

Here, the scale table shown in Table 2 is a two-level hierarchical table. However, a higher-level hierarchical table may be used as the scale table.

Next, functions of the scale adjustment module 209 will be described in detail. The scale adjustment module 209 searches the scale table as shown in Table 2 for corresponding maps on reduced and enlarged scale. Then, the scale adjustment module 209 enlarges handwriting information (second handwriting information) written in the retrieved map on reduced scale (second map image), for adjustment. In addition, the scale adjustment module 209 cuts out handwriting information (third handwriting information) corresponding to an area in the map on enlarged scale from the enlarged handwriting information. And/or, the scale adjustment module 209 reduces handwriting information (second handwriting information) written in the retrieved maps on enlarged scale (second map images), for adjustment. Moreover, the scale adjustment module 209 inserts the reduced handwriting information into corresponding areas in the map on reduced scale to create inserted handwriting information (third handwriting information).

Figure 3:
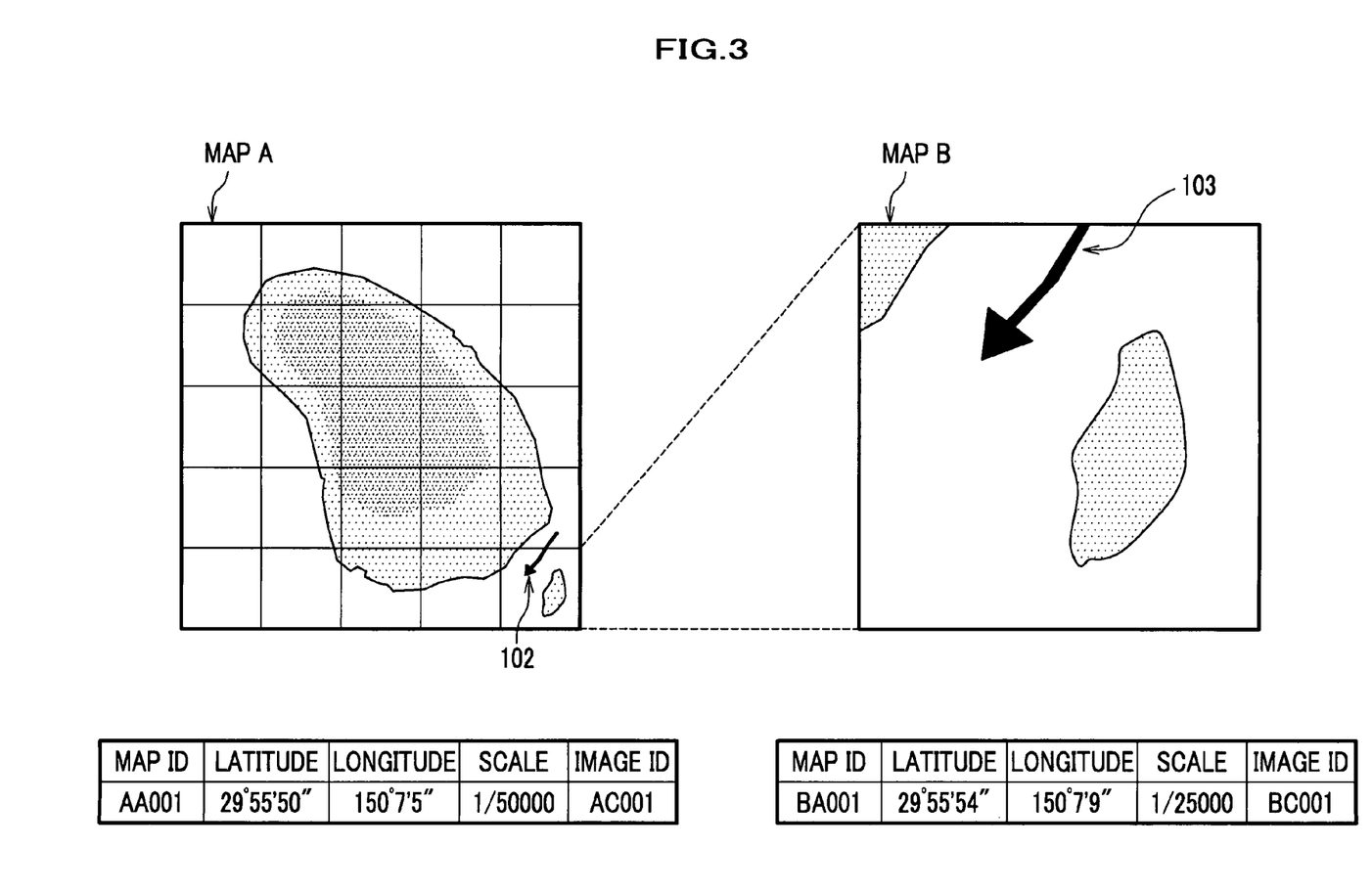
FIG. 3 is an explanatory diagram illustrating scale adjustment.

For instance, FIG. 3 is an explanatory diagram illustrating scale adjustment by the scale adjustment module 209. In the example shown in FIG. 3, when an arrow indicated by 102 in a map A is stored in the handwriting information database 212 as handwriting information associated with the map A, the arrow is reflected as handwriting information in a map B. The scale adjustment module 209 searches the scale table for correspondence between the map A and the map B to detect that the map B corresponds to an area at a lower right corner of the map A (second map image). Therefore, the scale adjustment module 209 multiplies the handwriting information (second handwriting information) of the arrow 102 in the map A by a reproduction ratio based on scales of map A and map B in order to enlarge the handwriting information. Moreover, the scale adjustment module 209 cuts out an area corresponding to the map B from the enlarged handwriting information in order to create handwriting information (third handwriting information) indicated by 103 in the map B.

(Map Information Management Unit)

The map information management unit 5 has functions to receive and store map information and a map image corresponding to the map information from the GIS server 8. The map information management unit 5 also has functions to assign a print request ID to a print instruction input by a user and to send a print request of the form 1, which includes format information and one or more map images specified by the print instruction, to the electronic pen processing unit 4.

As shown in FIG. 2, the map information management unit 5 of the present embodiment mainly includes a second processing module 216 which performs various information processes, a second storage unit 221 where various data are stored, and a second I/O module 215 which is an I/O interface between the network 7 and the map information management unit 5.

The second processing module 216 includes a print instruction module 217, a second search module 218, a second association module 219, and an information acquisition module 220. The print instruction module 217 receives a format ID to specify a format of the form 1 and map IDs to specify maps to be inserted in the form, and then sends a print request to the electronic pen processing unit 4. Here, the format ID and the map IDs are included in the print instruction input by the user. The second search module 218 searches a map information management database 222 for map images using the map IDs as search keys. The second association module 219 may associate the format ID and the map IDs which are input when the print instruction is input, with the print request ID. When there is not a map image corresponding to the image ID in the map information management database 222, the information acquisition module 220 acquires the map image corresponding to the image ID from the GIS server 8. Here, an output instruction module in the claims includes the print instruction module 217. The search module and the association module in the claims respectively include the second search module 218 and the second association module 219.

The second storage unit 221 includes the map information management database 222 to hold the map information and the map images which are acquired from the GIS server 8, and to hold the map information and the map images which are once used, as historical data. The map information management database 222 may also hold the format ID and the map IDs, which are input when the print instruction is input, and are associated with the print request ID. Here, a storage unit in the claims includes the first storage unit and the second storage unit.

(Network)

A single or combination of communication means with various standards such as LAN (Local Area Network), Internet, a wireless communication network, and so on may be employed as the network 7 to connect components with each other in the map information system.

The electronic pen processing unit 4 and the map information management unit 5 of the present embodiment may be computers including a CPU (Central Processing Unit), a RAM (Random Access Memory), a ROM (Read Only Memory), one or more hard disk drives, a network card, and so on. To implement each of function modules included in the first processing module 202 of the electronic pen processing unit 4 and the second processing module 216 of the map information management unit 5, dedicated programs stored in the hard disk drives may be loaded to the RAM and executed by the CPU. Here, a processing unit in the claims includes the first processing module and the second processing module.

(Operation of Map Information System)

Figure 4:
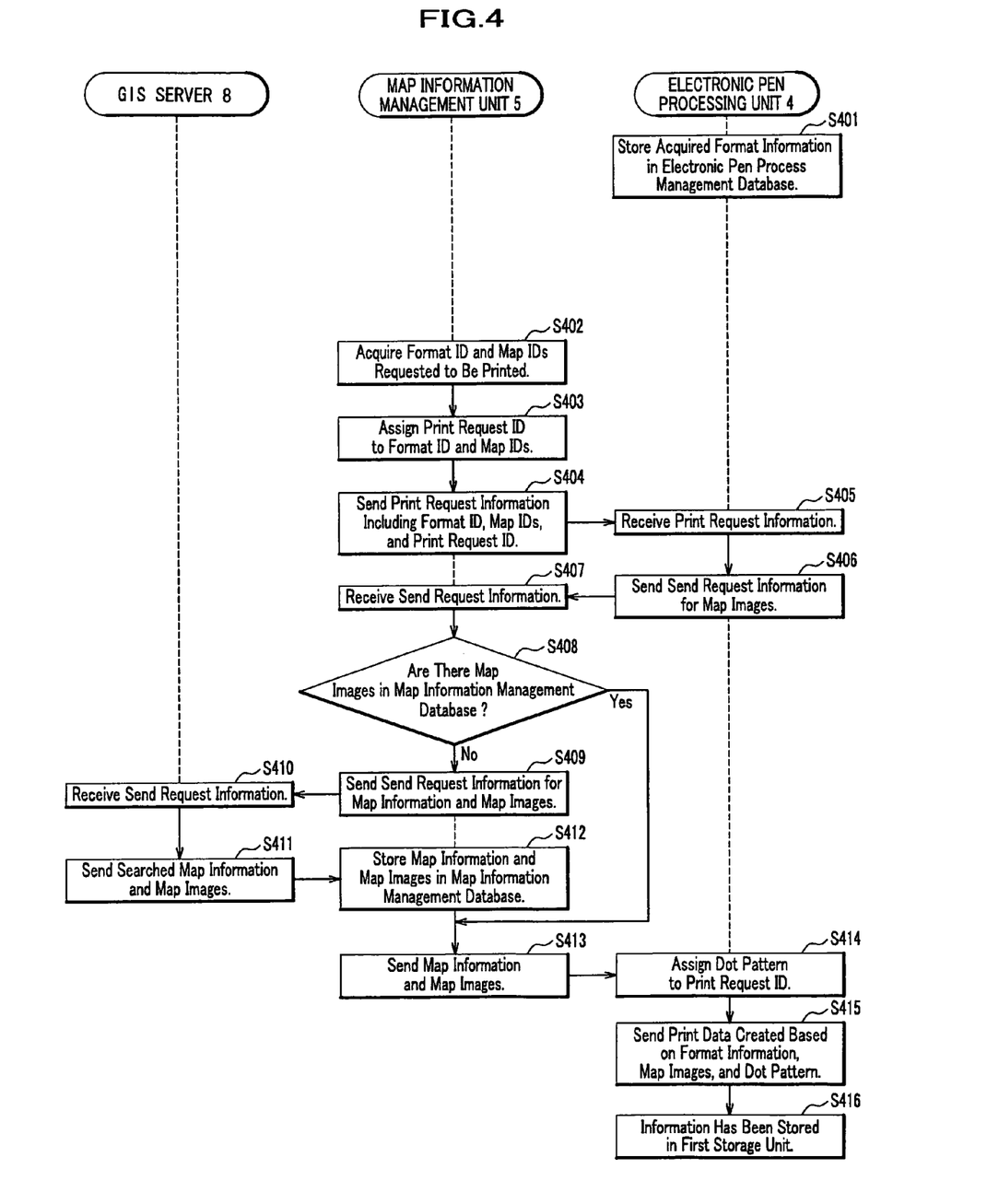
FIG. 4 is a flow chart showing a process to print a form which includes no handwriting information.

Next, with the map information system of the present embodiment, a process to print a form 1 which includes one or more map images and a dot pattern will be described referring to a flow chart shown in FIG. 4 (also referring to FIG. 2 as needed).

First of all, a user creates format information to define what kind of information is to be arranged in the form 1, where in the form 1 the information is to be arranged, and what is to be written or printed as the information, for each type of the form 1. The format information is input from the electronic pen terminal unit 3, or the like, and sent to the electronic pen processing unit 4. Then, the electronic pen processing unit 4 acquires and stores the format information in the electronic pen process management database 211 (Step S401). At this point, areas in the form 1 where the map images are to be inserted are defined.

Figure 5:
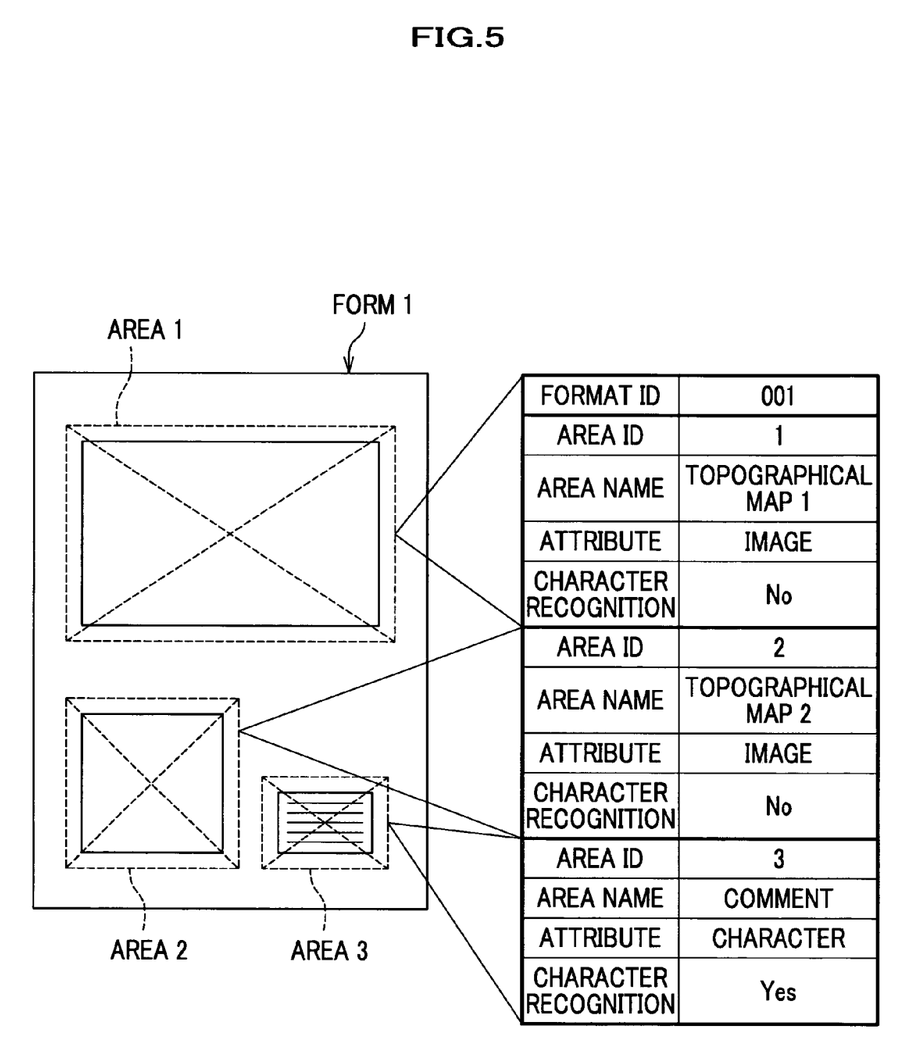
FIG. 5 is an explanatory diagram illustrating format information.

Here, FIG. 5 is an explanatory diagram illustrating a concept of the format information which is stored in Step S401. The format information will be described in detail referring to FIG. 5. As shown in FIG. 5, areas 1 through 3 where the handwriting information is to be written with the electronic pen 2 are specified in the form 1. And attribute information for each of the areas is defined. For instance, concerning the area 1 whose "Area ID" is "1", "Area Name", which is a name of the area, is "Topographical Map 1". "Attribute" of the handwriting information written in the area 1 is "Image" such as a sign, a line, and so on. "No" is set to "Character Recognition" since character recognition is not performed in the area 1.

Thus, the format information includes information to specify areas in the form 1 and the attribute information for each of the areas. Position information of each area may be included in the format information.

The format information is defined corresponding to each type of the form 1. Therefore, different format information is defined for the forms 1 for different usages. Accordingly, the format ID can be used to identify a type of the form 1.

Next, to request to print a desired form 1, a user inputs a format ID and one or more map IDs to the map information management unit 5. Here, the format ID specifies format information of the form 1 which is requested to be printed. The map IDs specify maps which are to be inserted in the form 1. Accordingly, the print instruction module 217 of the map information management unit 5 acquires the format ID and the map IDs which are requested to be printed (step S402). Moreover, the second association module 219 of the map information management unit 5 issues a unique print request ID and then assigns the print request ID to the format ID and the map IDs which are acquired in Step S402 (Step S403). Consequently, the print instruction module 217 sends print request information including the format ID, the map IDs, and the print request ID to the electronic pen processing unit 4 (Step S404).

The electronic pen processing unit 4 receives the print request information (Step S405). Then, the first search module 206 searches for the format information corresponding to the format ID included in the received print request information. Furthermore, the first search module 206 sends send request information for the map images corresponding to the map IDs included in the print request information to the map information management unit 5 (Step S406).

The map information management unit 5 receives the send request information (Step S407). Then, the second search module 218 determines whether there are the requested map images in the map information management database 222 (Step S408). When there are not some of the requested map images in the map information management database 222 ('No' in Step S408), there is not the map information corresponding to the map images in the map information management database 222, either. Therefore, the information acquisition module 220 sends send request information for the map information and the map images to the GIS server 8 (Step S409).

The GIS server 8 receives the send request information (Step S410) and searches its own storage devices for the map information and the map images corresponding to the send request information. Then, the GIS server 8 sends the retrieved map information and map images to the map information management unit 5 (Step S411).

The map information management unit 5 receives the map information and the map images and stores the received information in the map information management database 222 (Step S412). In addition, the map information management unit 5 sends the map information and the map images to the electronic pen processing unit 4 (Step S413).

In Step S408, when it is determined that there are some of the requested map images in the map information management database 222 ('Yes' in step S408), the map information management unit 5 sends the map information and the map images which are retrieved from the map information management database 222 to the electronic pen processing unit 4 (step S413).

The electronic pen processing unit 4 receives the map information and the map images. In addition, the pattern assignment module 207 of the electronic pen processing unit 4 assigns a dot pattern to the print request ID included in the print request information received in Step S405 (Step S414). Thus, print data are created based on the format information corresponding to the format ID included in the print request information acquired in Step S405, the map information and the map images sent in Step S413, and the dot pattern assigned in Step S414. After that, the print data is sent to the printer 6 (Step S415). In this way, the print instruction module 217 may issue a print instruction to the printer 6. Consequently, the printer 6 receives the print data and then prints the form 1.

The first association module 208 of the electronic pen processing unit 4 associates the dot pattern of the printed form 1, the format ID of the form 1, and the image IDs of the map images which are inserted in the form 1, with the print request ID acquired in Step S405. Thus, the first association module 208 stores the associated information in the electronic pen process management database 211. As a result, information has been stored in the first storage unit 210 (Step S416).

Through the above-mentioned process, the map information and the map images are stored in the map information management unit 5. The printer 6 outputs the form 1 which does not include the handwriting information. In addition, information about the printed form 1 is stored in the electronic pen processing unit 4.

Figure 6:
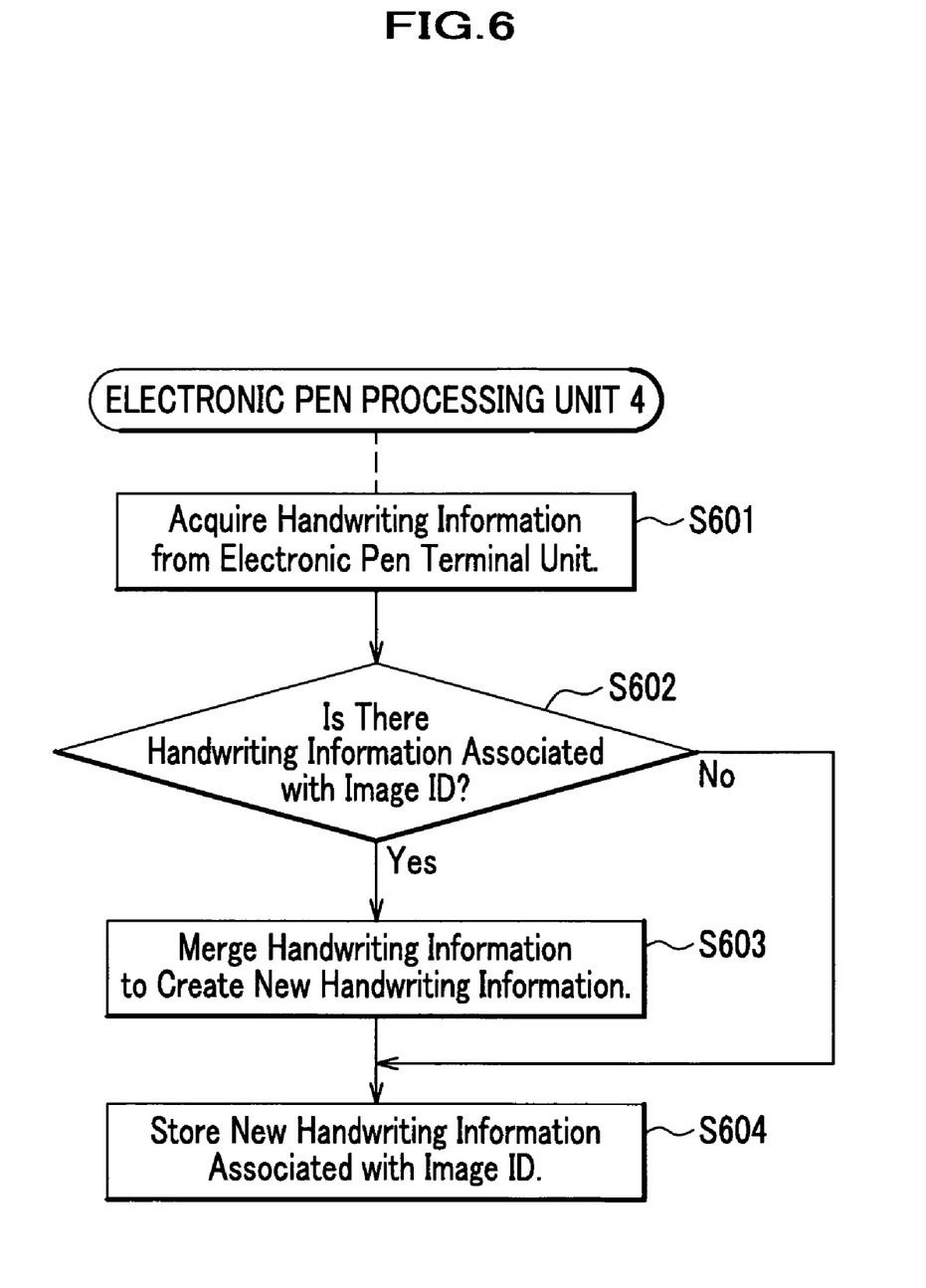
FIG. 6 is a flow chart showing a process to store handwriting information.

Next, a process to store handwriting information in the handwriting information database 212 of the electronic pen processing unit 4 will be described in detail referring to a flow chart shown in FIG. 6 (also referring to FIG. 2 as needed).

In this case, at first, a user writes the handwriting information using the electronic pen 2 in the form 1 which has been output through the above-mentioned process. Then, the handwriting information including a dot pattern corresponding to position in the form 1 is sent to the electronic pen terminal unit 3 from the electronic pen 2 and then sent to the electronic pen processing unit 4 through the network 7.

The electronic pen processing unit 4 acquires the handwriting information including the dot pattern from the electronic pen terminal unit 3 (Step S601). Then, the first search module 206 searches the electronic pen process management database 211 for an image ID corresponding to the dot pattern of the form 1. Thus, the electronic pen processing unit 4 determines whether there is the handwriting information associated with the image ID (Step S602).

Here, when there is the handwriting information associated with the image ID ('Yes' in Step S602), the data merge module 205 merges the handwriting information acquired in Step S601 with the associated handwriting information retrieved from the handwriting information database 212 in order to create new handwriting information (Step S603). Then, the first association module 208 associates the new handwriting information with the image ID and stores the associated handwriting information and image ID in the handwriting information database 212 (Step S604).

In Step S602, when there is not the handwriting information associated with the image ID ('No' in Step S602), the handwriting information acquired in Step S601 is associated with the image ID and the associated handwriting information is stored in the handwriting information database 212 (Step S604).

Through the above-mentioned process, the handwriting information input by the user using the electronic pen 2 is stored in the handwriting information database 212 of the electronic pen processing unit 4. Moreover, the handwriting information acquired from the electronic pen 2 is merged with the handwriting information previously written in the form 1. Therefore, it is possible to add handwriting information in the form 1 on-demand.

In the present embodiment, in Steps S602 and S603, the handwriting information is merged to be stored so that single handwriting information is stored for each image ID. However, a plurality of handwriting information may be associated with an image ID and the associated handwriting information may be stored without being merged.

A coordinate system of the handwriting information to be stored in the handwriting information database 212 is preferably converted from a coordinate system based on the dot pattern printed in the form 1 into a coordinate system in the map image (based on latitude and longitude) using a predetermined conversion function. As a result, the handwriting information can be used without consideration of a type of the dot pattern.

Figure 7:
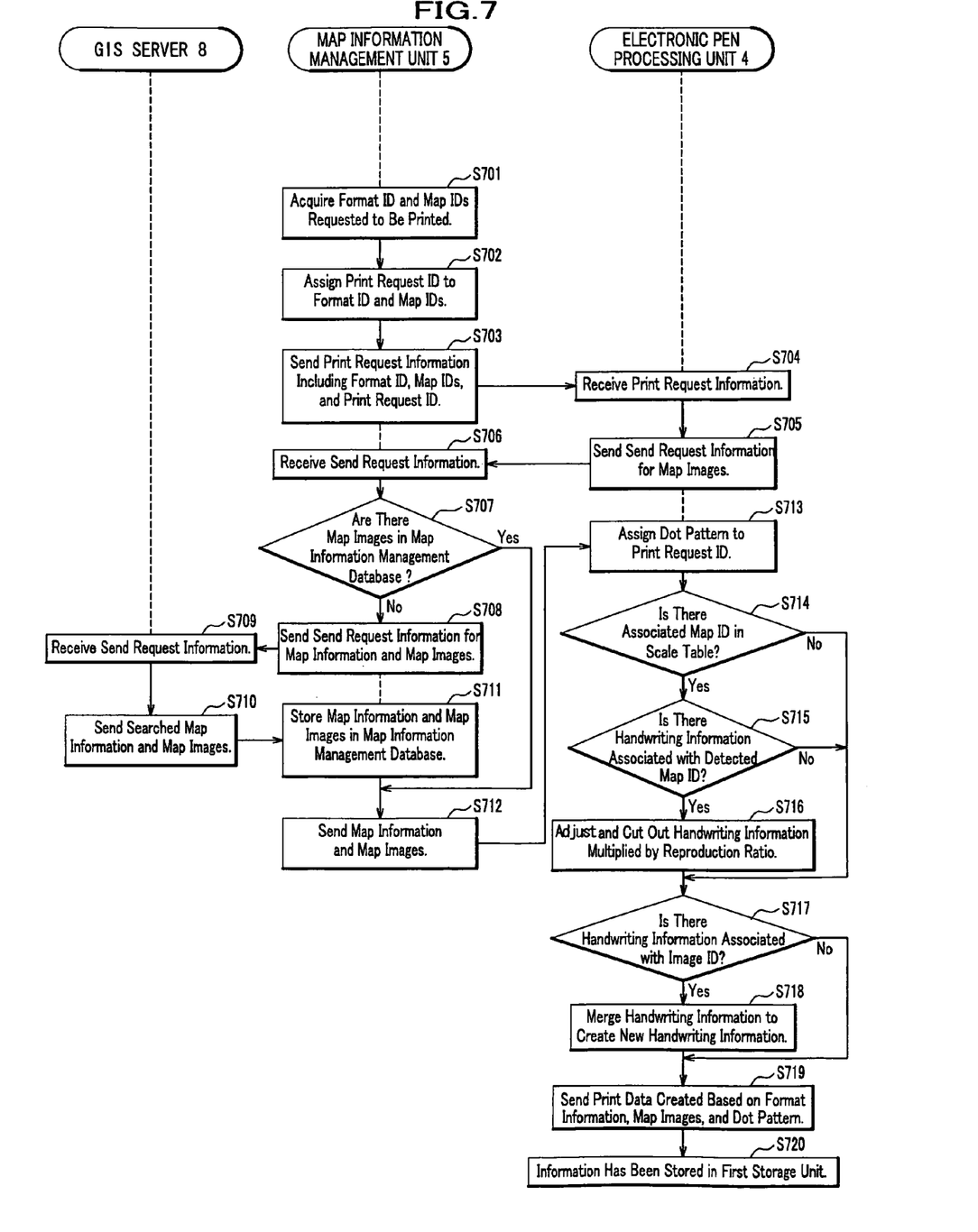
FIG. 7 is a flow chart showing a process to print a form which includes handwriting information adjusted in accordance with maps to be inserted in the form.

Next, a process to print a form 1 which includes handwriting information adjusted in accordance with a map to be inserted in the form 1 will be described in detail referring to a flow chart shown in FIG. 7 (also referring to FIG. 2 as needed).

First of all, to request to print a desired form 1, a user inputs a format ID and one or more map IDs to the map information management unit 5. Here, the format ID specifies format information of the form 1 which is requested to be printed. The map IDs specify maps which are to be inserted in the form 1. Accordingly, the print instruction module 217 of the map information management unit 5 acquires the format ID and the map IDs which are requested to be printed (Step S701). Moreover, the second association module 219 of the map information management unit 5 issues a unique print request ID and then assigns the print request ID to the format ID and the map IDs which are acquired in Step S701 (Step S702). Consequently, the print instruction module 217 sends print request information including the format ID, the map IDs, and the print request ID to the electronic pen processing unit 4 (Step S703).

The electronic pen processing unit 4 receives the print request information (Step S704). Then, the first search module 206 searches for the format information corresponding to the format ID included in the received print request information. Moreover, the first search module 206 sends send request information for the map images corresponding to the map IDs included in the print request information to the map information management unit 5 (Step S705).

The map information management unit 5 receives the send request information (Step S706). Then, the second search module 218 determines whether there are the requested map images in the map information management database 222 (Step S707). When there are not some of the requested map images in the map information management database 222 ('No' in Step S707), there is not the map information corresponding to the map images in the map information management database 222, either. Therefore, the information acquisition module 220 sends send request information for the map information and the map images to the GIS server 8 (Step S708).

The GIS server 8 receives the send request information (Step S709) and searches its own storage devices for the map information and the map images corresponding to the send request information. Then, the GIS server 8 sends the retrieved map information and map images to the map information management unit 5 (Step S710).

The map information management unit 5 receives the map information and the map images and stores the received information in the map information management database 222 (Step S711). In addition, the map information management unit 5 sends the map information and the map images to the electronic pen processing unit 4 (Step S712).

In Step S707, when it is determined that there are some of the requested map images in the map information management database 222 ('Yes' in step S707), the map information management unit 5 sends the map information and the map images which are retrieved from the map information management database 222 to the electronic pen processing unit 4 (step S712).

The electronic pen processing unit 4 receives the map information and the map images. In addition, the pattern assignment module 207 of the electronic pen processing unit 4 assigns a dot pattern to the print request ID included in the print request information received in Step S704 (Step S713).

Moreover, the scale adjustment module 209 of the electronic pen processing unit 4 determines whether there is map information (map IDs) of maps on different scales associated with the map information corresponding to each of the map IDs acquired in Step S704, in the scale table as shown in Table 2. Thus, the scale adjustment module 209 determines whether there are the associated map IDs in the scale table (Step S714).

Here, when there are the associated map IDs in the scale table ('Yes' in Step S714), the first search module 206 determines whether there is handwriting information associated with each of the map IDs which are retrieved from the scale table (or image IDs respectively corresponding to the map IDs), in the electronic pen process management database 211 (Step S715).

Then, when there is the handwriting information associated with the map ID retrieved from the scale table ('Yes' in Step S715), the first search module 206 of the electronic pen processing unit 4 searches the handwriting information database 212 for the handwriting information associated with the map ID (or the image ID corresponding to the map ID). After that, the scale adjustment module 209 multiplies the handwriting information by a reproduction ratio based on different scales in the map information corresponding to the two map IDs for adjustment. Moreover, the scale adjustment module 209 cuts out a corresponding size of the handwriting information from (or inserts) the multiplied handwriting information in order to create new handwriting information (Step S716).

Furthermore, when there is not the associated map ID in the scale table ('No' in Step S714), or when there is not the handwriting information associated with the map IDs retrieved from the scale table ('No' in Step S715), the process proceeds to Step S717 skipping the subsequent steps.

Next, in the electronic pen processing unit 4, the first search module 206 determines whether there is handwriting information associated with each of image IDs respectively corresponding to the map IDs acquired in Step S704, in the handwriting information database 212 (Step S717). Here, when there is the handwriting information associated with the image ID ('Yes' in Step S717), the data merge module 205 merges the retrieved handwriting information with the handwriting information created in Step S716, in order to create new handwriting information (Step S718).

Moreover, in Step S717, when there is not the handwriting information associated with the image ID ('No' in Step S717), the process proceeds to Step S719 by skipping Step S718.

Next, the electronic pen processing unit 4 creates print data based on the format information corresponding to the format ID acquired in Step S704, the map information and the map images sent in Step S712, the dot pattern assigned in Step S713, and the new handwriting information. Then, the print data is sent to the printer 6 (Step S719). In this way, the print instruction module 217 may issue a print instruction to the printer 6. Consequently, the printer 6 receives the print data and then prints the form 1.

The new handwriting information printed at this point of time varies depending on the handwriting information held in the handwriting information database 212. In other words, when there is the handwriting information associated with the map information retrieved from the scale table and there is the handwriting information associated with the map ID acquired in Step S704, the two of the handwriting information is merged to be printed. On the other hand, when there is only either one of the two of the handwriting information, the either one is the handwriting information to be printed. When there is none of the two of the handwriting information, no handwriting information is printed.

The first association module 208 of the electronic pen processing unit 4 associates the dot pattern of the printed form 1, the format ID of the form 1, handwriting IDs of the printed handwriting information, and the image IDs of the map images which are inserted in the form 1, with the print request ID acquired in Step S704. Thus, the first association module 208 stores the associated information in the electronic pen process management database 211. In addition, the first association module 208 associates the printed handwriting information with the image IDs of the map images respectively and stores the associated information in the handwriting information database 212. As a result, information has been stored in the first storage unit 210 (Step S720).

Through the above-mentioned process, the form 1 including the handwriting information adjusted in accordance with the maps to be inserted in the form 1 is printed.

Meanwhile, in the present embodiment, handwriting information is associated with each of image IDs by one to one. Because of this, the handwriting information is merged in Steps S714 through S717. On the other hand, when a plurality of handwriting information is associated with an image ID to be stored as described above, the user may select the handwriting information. In this case, the selected handwriting IDs of the handwriting information may be also acquired in Step S701 so that Steps S715 and S717 may be omitted. Moreover, a handwriting ID associated with each of the handwriting information and plurality of handwriting IDs associated with an image ID may be stored in the handwriting information database 212.

In the map information system according to the present embodiment, the map information and the handwriting information is associated for management. Therefore, the handwriting information can be reflected on map images inserted in even different types of the forms 1 as long as the map images are the same. Moreover, when a map whose scale is different from a map where the handwriting information is written is inserted in the form 1 and there is inclusion relation between the two maps, the handwriting information can be adjusted based on scales of the maps and reflected.

The present embodiment has been described without mentioning the operation of the character recognition module 203 for easy explanation. However, the handwriting information may be written in an area which is defined in the format information as an area where character recognition is to be performed. In this case, for instance, in the process shown in FIG. 7, the handwriting information can be recognized as characters by the character recognition module 203 after the handwriting information is merged in Step S718. After that, character codes, which are results of the character recognition, are associated with the handwriting information and stored in the handwriting information database 212, for instance.

Description has been given to two modes of the preferred embodiments according to the present invention. However, the present invention is not limited to these embodiments. Those skilled in the art, who belong to the technical field of the present invention, can implement or perform various embodiments according to the present invention.

For instance, the GIS server 8 is separately implemented in the present embodiments. However, the GIS server 8 itself may include the functions of the map information management unit 5.

Moreover, the electronic pen processing unit 4 and the map information management unit 5 may be unified. Additionally, a portion to perform printing in the electronic pen processing unit 4 may be implemented by another tool. Furthermore, the functions of the map information management unit 5 may be included in the electronic pen processing unit 4.

Moreover, print information is printed by the printer 6 to be output as the form 1 in the embodiments. However, the print information can be also output to a display device in the electronic pen terminal unit 3, a display device, which is not shown, connected to the other unit, or the like.

Therefore, the present invention is provided by technical concepts described in the following claims.

In the map information system according to the present embodiment, map information and handwriting information is associated to be stored. Therefore, handwriting information written in a map image can be shown even in different types of forms as long as the same map image is inserted in the forms.

What is claimed is:

1. A map information system comprising:
   an electronic pen which reads a dot pattern recorded as position information in a form where one or more map images are shown, to output a trace of a pen tip as handwriting information;
   a processing unit; and
   a storage unit, wherein
   the processing unit comprises:
   an association module which associates the handwriting information output by the electronic pen with one of the map images where the handwriting information is written and stores the associated handwriting information and map image in the storage unit;
   a search module which searches the storage unit to retrieve the associated handwriting information and map image using information to specify the map image as a search key;
   a pattern assignment module which when acquiring print request information including information to specify one or more map images to be printed, newly assigns a dot pattern to the acquired print request information; and
   an output instruction module which issues an output instruction so as to cause an output unit to visually output data including the associated handwriting information and map image retrieved by the search module and the dot pattern assigned by the pattern assignment module.

2. A map information system as claimed in claim 1, wherein the processing unit further comprises a data merge module which merges the handwriting information associated with the map image with handwriting information which is written in the map image and newly output by the electronic pen, and outputs the merged handwriting information, and wherein when the data merge module outputs the handwriting information, the association module associates the handwriting information output by the data merge module with the map image and stores the associated handwriting information and map image in the storage unit.

3. A map information system as claimed in claim 2, wherein when the print request information includes information to specify a plurality of handwriting information which is requested to be merged, the data merge module merges the plurality of handwriting information which corresponds to the information to specify the plurality of handwriting information.

4. A map information system as claimed in claim 1, wherein the storage unit holds scale correspondence information which includes scale information for map images and information to indicate positional relationship among map images on different scales, wherein the processing unit further comprises a scale adjustment module which when a second map image corresponding to the information to specify the map image included in the print request information is detected in the scale correspondence information, multiplies second handwriting information associated with the second map image by a reproduction scale based on scales of the map image and the second map image for adjustment and performs cutout from or insertion of the multiplied second handwriting information based on the positional relationship to create third handwriting information, and wherein when the scale adjustment module creates the third handwriting information, the output instruction module issues the output instruction so as to cause the output unit to visually output data including the third handwriting information and the map image.

5. A map information processing method in a map information system comprising:

an electronic pen which reads a dot pattern recorded as position information in a form where one or more map images are shown, to output a trace of a pen tip as handwriting information;

a processing unit; and a storage unit, the map information processing method comprising:

an association step in which an association module of the processing unit associates the handwriting information output by the electronic pen with one of the map images where the handwriting information is written and stores the associated handwriting information and map image in the storage unit;

a search step in which a search module of the processing unit searches the storage unit to retrieve the associated handwriting information and map image using information to specify the map image as a search key;

a pattern assignment step in which when acquiring print request information including information to specify one or more map images to be printed, a pattern assignment module of the processing unit newly assigns a dot pattern to the acquired print request information; and an output instruction step in which an output instruction module of the processing unit issues an output instruction so as to cause an output unit to visually output data including the associated handwriting information and map image retrieved by the search module and the dot pattern assigned by the pattern assignment module.

6. A map information processing method as claimed in claim 5, wherein in the association step, when the associated handwriting information and map image have already been stored in the storage unit, a data merge module of the processing unit merges the handwriting information already stored in the storage unit with handwriting information output by the electronic pen, and outputs the merged handwriting information, and the association module associates the handwriting information output by the data merge module with the map image and stores the associated handwriting information and map image in the storage unit.

7. A map information processing method as claimed in claim 6, wherein in the search step, when the print request information including information to specify a plurality of handwriting information which is requested to be merged is acquired, the data merge module merges the plurality of handwriting information which corresponds to the information to specify the plurality of handwriting information, and wherein in the output instruction step, the output instruction module issues an output instruction so as to cause the output unit to visually output data including the map image retrieved by the search module, the handwriting information output by the data merge module, and the dot pattern assigned by the pattern assignment module.

8. A map information processing method as claimed in claim 5, wherein the storage unit holds scale correspondence information which includes scale information for map images and information to indicate positional relationship among map images on different scales, the map information processing method further comprising a scale adjustment step in which when a second map image corresponding to the information to specify the map image included in the print request information is detected in the scale correspondence information, a scale adjustment module of the processing unit multiplies second handwriting information associated with the second map image by a reproduction scale based on scales of the map image and the second map image for adjustment and performs cutout from or insertion of the multiplied second handwriting information based on the positional relationship to create third handwriting information, and wherein in the output instruction step, when the adjustment module creates the third handwriting information, the output instruction module issues the output instruction so as to cause the output unit to visually output data including the third handwriting information and the map image.

9. A computer readable storage medium having computer executable instructions which cause a computer to perform the map information processing method as claimed in claim 5.

10. A computer readable storage medium having computer executable instructions which cause a computer to perform the map information processing method as claimed in claim 6.

11. A computer readable storage medium having computer executable instructions which cause a computer to perform the map information processing method as claimed in claim 7.

12. A computer readable storage medium having computer executable instructions which cause a computer to perform the map information processing method as claimed in claim 8.

* * * * *